H. A. BOCKER.
CAR FENDER OPERATING MEANS.
APPLICATION FILED SEPT. 9, 1918.
1,300,919.
Patented Apr. 15, 1919.
2 SHEETS—SHEET 2.
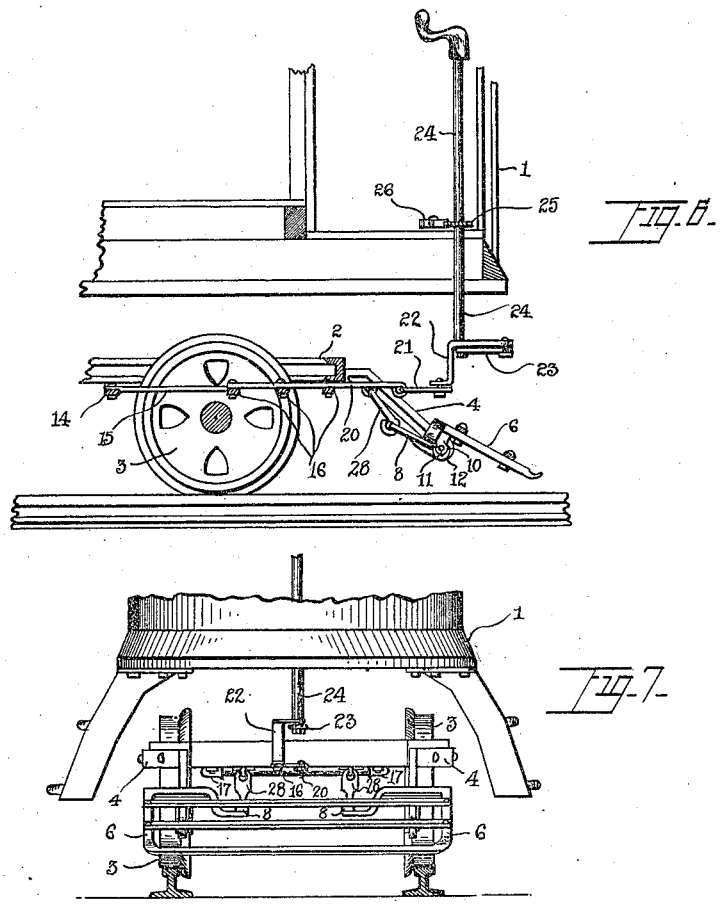

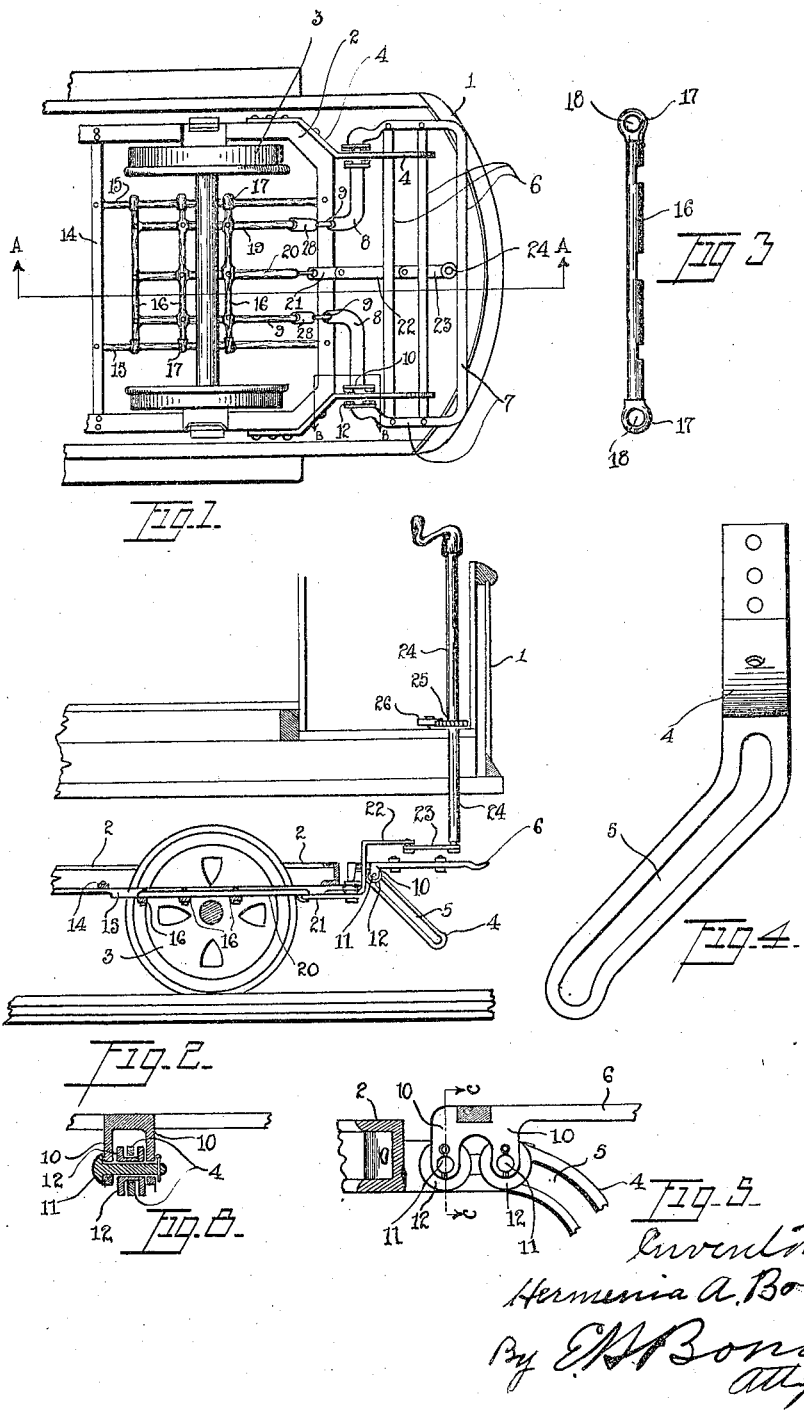

UNITED STATES PATENT OFFICE.

HERMENIA A. BOCKER, OF BUFFALO, NEW YORK.

CAR-FENDER-OPERATING MEANS.

1,300,919.　　　　　Specification of Letters Patent.　　Patented Apr. 15, 1919.

Application filed September 9, 1918. Serial No. 253,268.

*To all whom it may concern:*

Be it known that I, HERMENIA A. BOCKER, a citizen of the United States, residing at Buffalo, in the county of Erie, State of New York, U. S. A., have invented certain new and useful Improvements in Car-Fender-Operating Means, of which the following is a specification.

This invention relates to car fender operating means.

The object of the invention is to provide means for operating a car fender, which when not in operation will be out of the way.

A further object of the invention is to provide means for operating a car fender, which can be easily controlled by a motorman.

With the above and other objects in view the invention consists of the parts and the construction of parts as hereinafter more fully described and claimed, having reference to the accompanying drawings, in which—

Figure 1 is a view showing a front section of the underneath part of a car, with my invention adapted thereto.

Fig. 2 is a sectional view of the line A—A of Fig. 1, showing the fender up.

Fig. 3 is one of the cross members of the fender.

Fig. 4 is an enlarged view of one of the runways for the fender.

Fig. 5 is an enlarged view of a section of the fender and runway.

Fig. 6 is the same as Fig. 2, only showing fender down.

Fig. 7 is a front perspective view of a car, with the fender down.

Fig. 8 is a sectional view on the line C—C of Fig. 5.

1 designates the car in general and 2 the truck, mounted on the set of wheels 3. 4 is a set of runway members having one end bent to fit and rivet to the truck 2. 5 is the runway in each of the members 4. 6 is the fender. This fender 6 may have any desired style of netting over it. The main frame 7 is all one piece bent so that the ends 8 come on the inside. These ends are provided with orifices 9. 10 are the side flanges of the main frame 7, through which the pins 11 pass. The pins 11 act as axles for the small wheels 12. The wheels 12 are in two pairs, one pair on each side of the fender and are adapted to run in the runway 5. The wheel on the outer side is located just at the angle point when the runway 5 turns down.

14 is a cross member between the sides of the truck 2, behind the front wheels 3. 15 is a pair of bar members one pair of ends of which is secured to member 14 and the other pair of ends to the front of the truck 2. 16 is a series of cross members having threaded ends and caps 17 screwed thereon. Each of these caps 17 has an orifice 18. The cross members 16 are rigidly fastened together by means of the members 19 which extend at right angles to cross members 16 and which members notch into each other at the crossing points. It will be seen that these members form a carriage to operate on bar members 15. The members 19 each has its front end fastened to a link 28, which link attaches through the orifice 9 in end 8 of the main frame 7 of the fender 6.

20 is a pull-bar, running parallel to and at an equal distance from each of the members 19. The pull-bar 20 is riveted or otherwise attached to the cross members 16. The outer end of pull-bar 20 is hooked through an orifice in a link 21, which link 21 is attached to member 22.

22 is the member which is bent so as to join link 21 to a link 23. Link 23 is attached to the end of the controller 24. Controller 24 extends up through the floor of the car and is provided with any suitable handle. Controller 24 is further provided with a cog wheel 25 and a dog 26.

Having thus described the various parts of my invention, I will now explain its operation.

The fender 6 is normally held in the position as shown in Fig. 2, the fender 6 being under the front part of the car. It is held in this position until required to be dropped. To drop the fender all the motorman is required to do is to kick the dog 26 out of contact with the cog wheel 25. When this is done the fender 6 will by gravity go down the runway 5. As stated before one pair of the wheels 12 is positioned on the angle when the fender 6 is up and thus it will be seen that there is a great tendency for gravity to act as the front side of the fender is suspended.

When the fender 6 falls to the position as shown in Fig. 6 it will be seen that it pulls the carriage which is made of the members 19 and 20 and cross members 16 secured together, forward.

The runway 5 may be of any length so as to allow the fender 6 to drop to any desired distance from the ground. The lower end of the runway 5 may be turned up if desired so as to tilt the fender up slightly.

To pull the fender 6 back in its usual position, the motorman is only required to turn the controller 24 and, when fender 6 is in usual position, engage the dog 26 in one of the cogs of the cog wheel 25.

The controller is connected to the pull-bar 20 by means of the link 21, member 22, end link 23 and thus by turning the controller 24 the previously mentioned carriage is pulled out or pushed back in place.

The said carriage is attached to the fender 6 by means of the links 28. Thus it will be seen that the controller 24 will operate the fender, in lowering or raising.

From the foregoing description, it is thought to be obvious that a car fender operating means constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

What I claim as new, is:—

1. A car fender operating means, consisting of a slidably mounted carriage, adapted to work on bar members attached to a car truck, a controller, being provided with a cog wheel and dog, said controller being connected with said slidably mounted carriage, said carriage being connected with a fender, runways attached to said car truck, pairs of small wheels attached to said fender and adapted to operate in said runways.

2. A car fender operating means, consisting of a slidably mounted carriage, bar members attached to a car truck, said carriage being adapted to be operated back and forth on said bar members, said carriage being connected to a fender, said carriage being connected to a controller, said controller being adapted to extend through the floor of a car, said controller being provided with a cog wheel and dog, runways attached to sides of a car truck, pairs of wheels adapted to be mounted on a car fender, said wheels being adapted to operate in said runways.

In testimony whereof I affix my signature in the presence of two witnesses.

HERMENIA A. BOCKER.

Witnesses:
 FLORENCE A. WARREN,
 SOPHIA SWICK.

Copies of this patent may be obtained for five cents each, by addressing the "Commissioner of Patents. Washington, D. C."